(12) United States Patent
Sugioka et al.

(10) Patent No.: US 7,721,642 B2
(45) Date of Patent: May 25, 2010

(54) SLIDING MEMBER

(75) Inventors: Takahiro Sugioka, Kariya (JP);
Takayuki Kato, Kariya (JP); Shuichi Yasuda, Kariya (JP); Atsushi Saito, Kariya (JP); Masahiro Suzuki, Kariya (JP); Hitotoshi Murase, Kariya (JP); Takashi Iseki, Aichi-ken (JP); Hideo Tachikawa, Nisshin (JP); Kazuyuki Nakanishi, Seto (JP); Takao Kobayashi, Seto (JP); Ken-ichi Suzuki, Nagoya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 347 days.

(21) Appl. No.: 12/021,673

(22) Filed: Jan. 29, 2008

(65) Prior Publication Data
US 2008/0190284 A1 Aug. 14, 2008

(30) Foreign Application Priority Data
Jan. 30, 2007 (JP) ............................. 2007-018980

(51) Int. Cl.
*F01B 31/10* (2006.01)

(52) U.S. Cl. ...................................................... 92/155
(58) Field of Classification Search .................... 92/71, 92/155
See application file for complete search history.

(56) References Cited

U.S. PATENT DOCUMENTS

| | | | |
|---|---|---|---|
| 6,123,009 A | 9/2000 | Kanayama et al. | |
| 6,582,200 B2 * | 6/2003 | Kato et al. | 92/71 |
| 6,589,021 B2 * | 7/2003 | Kato et al. | 92/71 |
| 6,644,172 B1 * | 11/2003 | Nakayama et al. | 92/71 |
| 7,134,381 B2 * | 11/2006 | Ueno et al. | 92/155 |
| 7,188,562 B2 * | 3/2007 | Hansen et al. | 92/71 |
| 7,228,786 B2 * | 6/2007 | Hamada et al. | 92/155 |
| 7,406,912 B2 * | 8/2008 | Fukanuma et al. | 92/71 |
| 2002/0022129 A1 | 2/2002 | Moronuki | |

FOREIGN PATENT DOCUMENTS

| | | |
|---|---|---|
| JP | 06346074 | 12/1994 |
| JP | 775150 | 3/1995 |
| JP | 09094911 | 4/1997 |
| JP | 10205442 | 8/1998 |
| JP | 11193780 | 7/1999 |
| JP | 2001280236 | 10/2001 |
| JP | 20025013 | 1/2002 |
| JP | 2005133593 | 5/2005 |
| JP | 200718980 | 1/2007 |

* cited by examiner

*Primary Examiner*—Michael Leslie
(74) *Attorney, Agent, or Firm*—Woodcock Washburn LLP (57) ABSTRACT

To provide a sliding member that exhibits excellent durability and is free of lead. A swash plate for a compressor as the sliding member of the invention contains a base material having on the surface thereof a sliding layer constituting at least a sliding surface, on which shoes slide. The sliding layer contains a first layer that contains an amorphous hard carbon (diamond-like carbon) film containing Si (DLC-Si film) and is formed on the base material, and a second layer that is formed on the first layer and contains polyamideimide (PAI) containing a solid lubricant such as $MoS_2$.

5 Claims, 5 Drawing Sheets

SLIDING MEMBER

CROSS-REFERENCE TO RELATED APPLICATION

This application claims the benefit of priority to Japanese Patent Application No. 2007-18980, filed on Jan. 30, 2007, the contents of which are hereby incorporated herein by reference.

BACKGROUND OF THE INVENTION

The present invention relates to a sliding member.

A swash plate for a compressor is disclosed in JP-A-10-205442, JP-A-11-13638, JP-A-11-193780, JP-A-2001-280236 and JP-A-2002-5013 as an example of a conventional sliding member. The swash plate contains a base material having formed on the surface thereof sliding layers constituting sliding surfaces, on which shoes slide.

The swash plates disclosed in JP-A-10-205442, JP-A-11-13638 and JP-A-11-193780 employ a sliding layer containing a first layer formed on the base material and a second layer formed on the first layer. The base material of the swash plate is ordinarily formed of an iron material, such as spheroidal graphite cast iron (FCD) or bearing steel (SUJ2). The swash plate has the first layer formed of Sn formed by plating, Cu—Sn—Pd formed by thermal spraying or the like, and the second layer formed of polyamideimide (PAI) containing $MoS_2$.

JP-A-2001-280236 and JP-A-2002-5013 disclose a swash plate having a sliding layer containing an amorphous hard carbon (diamond-like carbon (DLC)) film formed on the base material. JP-A-2001-280236 also discloses that the DLC film may contain silicon (Si).

The swash plate is used in a swash plate compressor. The swash plate compressor contains a housing having formed therein cylinder bores, a crank chamber, a suction chamber and a discharge chamber, pistons being reciprocably housed in the each cylinder bore and comparting compression chambers in the each cylinder bore, a driving shaft being driven with an external driving source and being supported rotatably with the housing, and a swash plate being provided inside the crank chamber and converting the rotational movement of the driving shaft to a reciprocal movement of the pistons through each pairs of shoes in contact with front and rear surfaces of the swash plate. An ordinary swash plate is a single member and is rotatable along with the driving shaft in a state where the front and rear surfaces thereof is inclined with respect to the driving shaft. The shoes are each in a substantially hemispherical shape, and the substantially flat surfaces of the shoes are in contact with the front and rear surfaces of the swash plate.

In the swash plate compressor having the structure, the driving shaft is rotated with the external driving source to rotate the swash plate, whereby the pistons are reciprocated in the cylinder bores. According to the operation, the swash plate compressor sucks refrigerant from the suction chamber and compresses the refrigerant in the compression chambers, followed by discharging the refrigerant to the discharge chamber.

The swash plate compressor is used with an evaporator, an expansion valve, a condenser and piping to constitute a refrigeration circuit of a vehicle or the like, thereby attaining air-conditioning in a vehicle interior or the like.

The environment, under which a sliding member is used, is becoming severer owing, for example, to high-speed driving of a swash plate compressor, and there is a demand for a sliding member that is capable of exhibiting excellent sliding property as compared to a conventional product. A swash plate free of lead in a sliding layer is also demanded in view of protection of natural environments. Taking the demands in consideration, the inventors have confirmed the following phenomena associated with the conventional swash plate.

The second layer formed of PAI containing $MoS_2$ in the conventional sliding layer may be peeled off upon long-term use due to unavoidable foreign matters that may present in the crank chamber of the swash plate compressor. The first layer, which is formed of Sn or Cu—Sn—Pb by plating or thermal spraying, is exposed thereby, and is demanded to attain improvement in durability under poor lubrication conditions.

The conventional sliding layer formed of a DLC film exhibits excellent sliding property as compared to the first layer formed of Sn or Cu—Sn—Pb by plating or thermal spraying since the DLC film shows a low friction coefficient under poor lubrication conditions, but under conditions where substantially no lubricating oil is present, the sliding layer slides directly on shoes as counterparts, which brings about possibility of deterioration in durability.

Under the circumstances, the inventors have investigated that a DLC film is used as the first layer of the sliding layer, and PAI containing $MoS_2$ is used as the second layer.

However, the sliding layer is insufficient in adhesion of the second layer. As a countermeasure, the surface of the base material may be roughened for improving the adhesion of the second layer on the first layer formed of a DLC film. In the case where the second layer is peeled off upon long-term use, however, hard protrusions may attack the shoes to impair the sliding property of the shoes with respect to the swash plate, whereby there are problems including sticking of the shoes to the piston, which brings about possibility of deterioration in durability of the swash plate compressor.

BRIEF SUMMARY OF THE INVENTION

The invention has been made in view of the aforementioned circumstances associated with the conventional art, and an object thereof is to provide a sliding member that exhibits excellent durability and is free of lead.

The inventors have made earnest investigations for developing the first layer formed of a DLC film that is excellent in adhesion to the second layer, and have found that a first layer formed of a film of DLC containing Si (DLC-Si film) exhibits high adhesion to the second layer to attain the aforementioned and other objects of the invention.

The sliding member according to an aspect of the invention contains a base material having on the surface thereof a sliding layer. The sliding layer constitutes at least a sliding surface. The sliding layer contains a first layer that contains an amorphous hard carbon film containing Si formed on the base material, and a second layer that contains a polymer containing an amide group and/or an imide group and contains a solid lubricant formed on the first layer.

The sliding member may be a swash plate used in a compressor, and the sliding layer may constitute at least a sliding surface, on which shoes slide.

According to experimental results by the inventors, the sliding member of the invention prolongs the period of time until the sliding member is stuck to the shoes under severe lubricant conditions. The swash plate of the invention has the second layer that is favorably adhered as compared to a swash plate having a sliding layer using a first layer formed of a DLC film containing no Si, so as to prolong the period of time until the sliding member is stuck to the shoes.

The inventors consider the advantages of the invention as follows. The DLC film in the invention contains Si in addition to carbon (C) and hydrogen (H). In the sliding member of the invention, even when unavoidable foreign matters are present, for example, in a crank chamber of a swash plate compressor, the second layer is hard to peel off since the second layer is favorably adhered to the first layer containing a DLC-Si film. It is considered that this is because fine irregularities of about 100 nm on the surface of the first layer function as anchors with respect to the second layer. It is considered that a DLC-Si film has on the surface thereof a silanol (SiOH) group having an OH group bonded to Si. A silanol group having polarity exhibits mutual action strongly with an amide bond and an imide bond having polarity contained in the resin, whereby DLC-Si is firmly adhered to the resin. In particular, the DLC-Si film is hard to wear since a silanol (SiOH) group having an OH group bonded to Si on the surface thereof decreases the frictional force of the limiting membrane. Formation of a silanol group can be confirmed, for example, by XPS analysis utilizing the derivatization method.

For example, JP-A-6-346074 and JP-A-7-75150 disclose that a DLC film containing Si and nitrogen (N) is a material excellent in sliding property and wear resistance. However, these are not limited to a sliding member, which necessarily reckons foreign matters that may be present in a crank chamber of a swash plate compressor. Furthermore, it is a conception by the inventors that a problem is recognized in adhesion of the second layer formed of PAI containing a solid lubricant having been used in a sliding member, and a DLC-Si layer is used as the first layer as a countermeasure to the problem and for further improvement in durability.

Accordingly, the sliding member of the invention exhibits excellent durability and is free of lead, thereby excellently protecting natural environments. A swash plate compressor using the sliding member as a swash plate exhibits excellent environmental performance and realizes a prolonged service life.

Other aspects and advantages of the invention will be apparent from embodiments disclosed in the attached drawings, illustrations exemplified therein, and the concept of the invention.

BRIEF DESCRIPTION OF THE SEVERAL VIEWS OF THE DRAWINGS

The invention will be described in more detail along with the concept and advantages thereof by referring to the attached drawings and the detailed description of the preferred embodiments below.

DETAILED DESCRIPTION OF THE PREFERRED EMBODIMENTS

Embodiment 1

Figure 1:
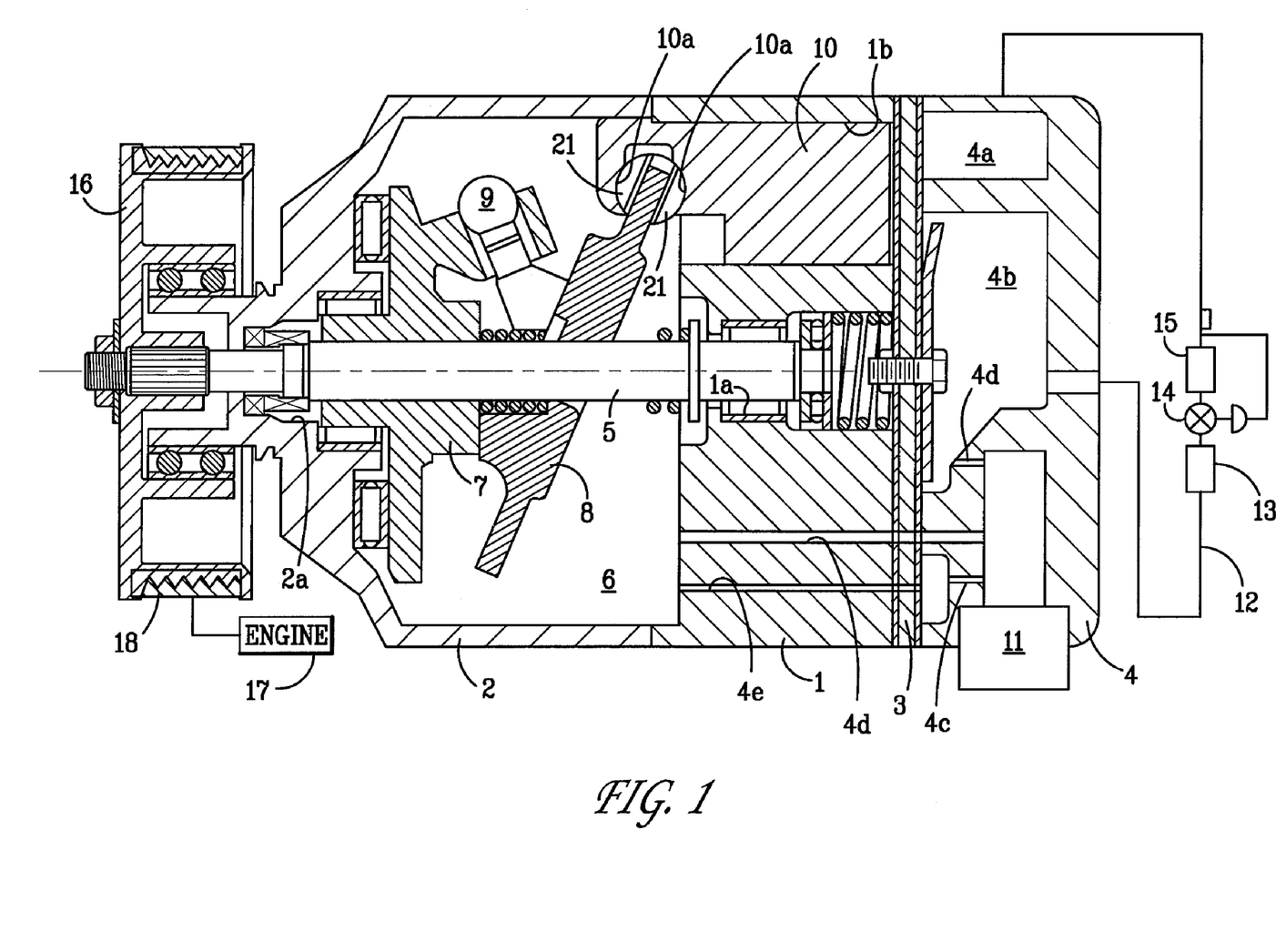
FIG. 1 is a vertical cross sectional view showing a swash plate compressor of Embodiment 1.

A capacity variable swash plate compressor using a swash plate for the compressor as a sliding member of Embodiment 1 will be described. The compressor has, as shown in FIG. 1, a front housing 2 connected to a front end of a cylinder block 1, and a rear housing 4 connected to a rear end of the cylinder block 1 through a valve unit 3. The cylinder block 1 and the front housing 2 have shaft holes 1a and 2a extending in the axial direction, and a driving shaft 5 is rotatably supported by the shaft holes 1a and 2a through bearing units etc., respectively. In FIG. 1, the lower side is referred to as a front side, and the upper side is referred to as a rear side.

A crank chamber 6 is provided inside the front housing 2. In the crank chamber 6, a lag plate 7 is fixed to the driving shaft 5 and is supported by the front housing 2 through a bearing unit. In the crank chamber 6, a swash plate 8 is provided on the rear side of the lag plate 7. The driving shaft 5 penetrates the swash plate 8, and in this state, the inclination angle of the swash plate 8 is changed by a linkage mechanism 9 provided between the lag plate 7 and the swash plate 8.

Plural cylinder bores 1b extending in the axial direction penetrate concentrically the cylinder block 1. A single head piston 10 is housed reciprocably in each of the cylinder bores 1b. A neck part is provided on each of the pistons 10 on the side of the crank chamber 6, and spherical surface bearings 10a facing each other are provided as being depressed in the neck part of each of the pistons 10.

Figure 2:
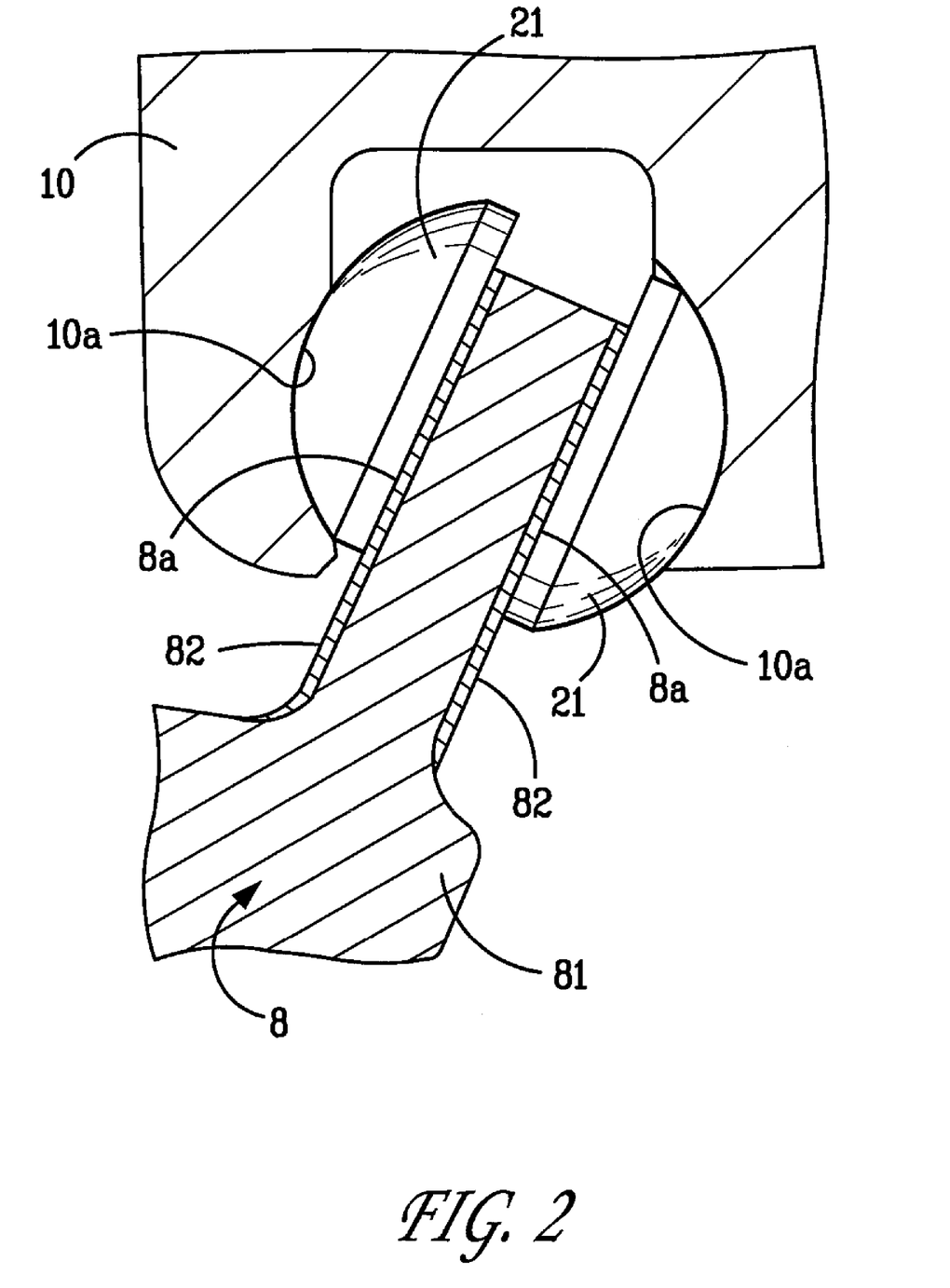
FIG. 2 is an enlarged cross sectional view of an important part of the swash plate compressor of Embodiment 1.
Figure 3A:
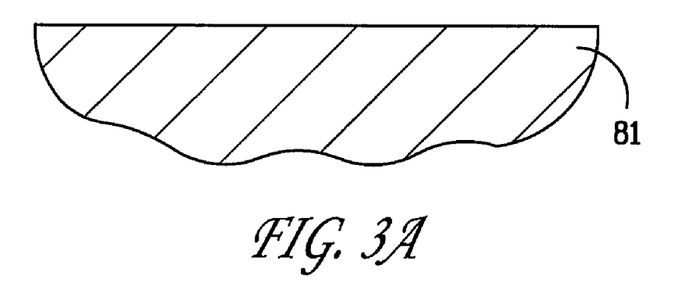
FIGS. 3A to 3C are cross sectional views showing a production process of a swash plate for the compressor of Embodiment 1.

Pairs of front and back shoes 21 are provided between the swash plate 8 and each of the pistons 10. As shown in FIG. 2, the swash plate 8 contains a base material 81 and sliding layers 82 formed on the peripheries of the front and rear surfaces of the base material 81. The base material 81 is formed of an iron material, such as FCD or SUJ2. As shown in FIG. 3C, the sliding layer 82 contains a first layer 82a formed on the base material 81, and a second layer 82b formed on the first layer 82a. The first layer 82a is formed of a DLC-Si film, and the second layer 82b is formed of PAI containing $MoS_2$ and an epoxy resin.

As shown in FIG. 2, the surfaces of the sliding layers 82 constitute flat sliding surfaces 8a and 8a, on which the shoes slide. Each of the shoes 21 has a substantially hemispherical shape. The hemispherical surface of the shoe 21 is in contact with the bearing 10a of the piston 10, and the substantially flat surface thereof is in contact with the sliding surface 8a and 8a of the swash plate 8.

A suction chamber 4a and a discharge chamber 4b are provided in the rear housing 4. Each cylinder bore 1b is connected to the suction chamber 4a through a suction valve mechanism of the valve unit 3, and is connected to the discharge chamber 4 through a discharge valve mechanism of the valve unit 3.

A capacity controlling valve 11 is housed in the rear housing 4. The capacity controlling valve 11 is connected to the suction chamber 4a through a detection path 4c and connects the discharge chamber 4b and the crank chamber 6 through an aeration path 4d. The capacity controlling valve 11 changes the valve lift for the aeration path 4d through detection of the pressure inside the suction chamber 4a, so as to control the discharge capacity of the compressor. The crank chamber 6 and the suction chamber 4a are connected to each other through an extraction path 4e. The discharge chamber 4b is connected to a condenser 13, an expansion valve 14 and an evaporator 15 through piping 12, and the evaporator 15 is connected to the suction chamber 4a through the piping 12.

A pulley 16 is provided rotatably at the front end of the front housing 2 through a bearing unit, and the pulley 16 is fixed to the driving shaft 5. A belt 18, which is rotationally driven with an engine 17, is wound on the pulley 16.

The swash plate 8 is produced in the following manner. As shown in FIG. 3A, the base material 81 formed of an iron material, such as FCD or SUJ2, is prepared by casting, cutting or the like.

Figure 4:
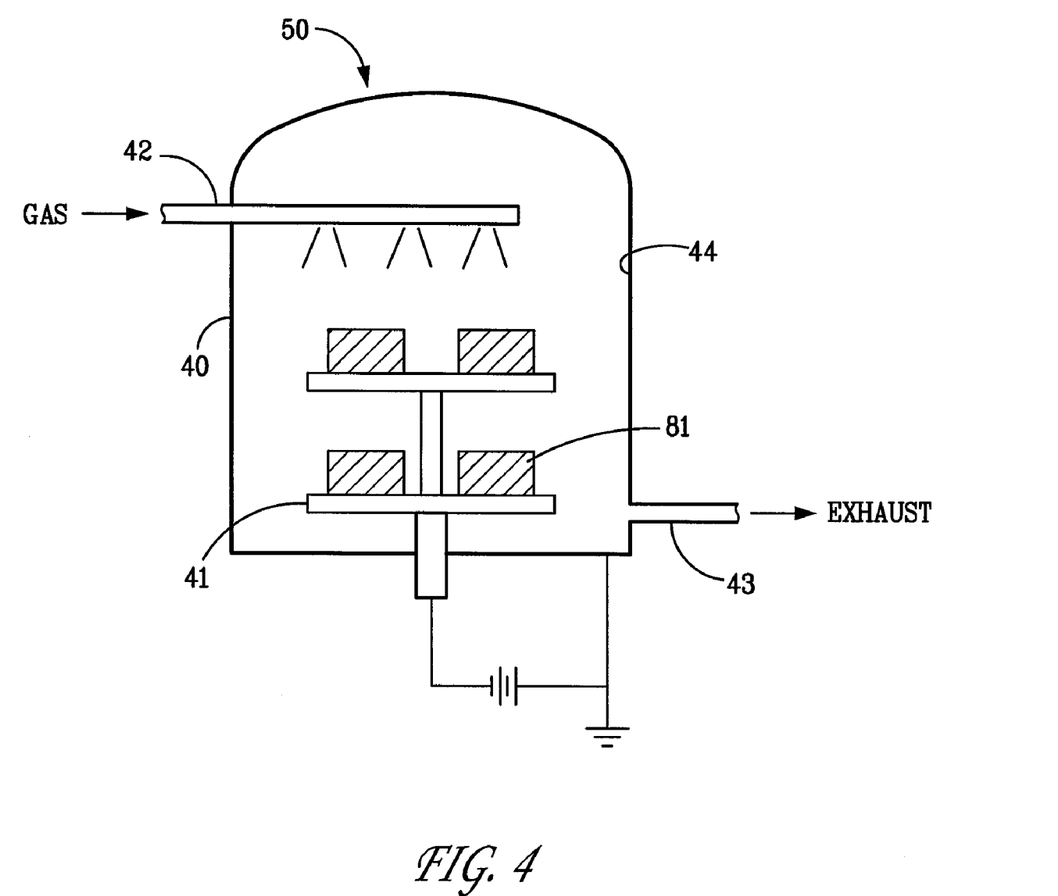
FIG. 4 is a cross sectional view showing a production process of a swash plate for the compressor of Embodiment 1.

A DLC-Si film as the first layer 82a is formed on the surface of the base material 81 in the following manner using a direct current plasma CVD (PCVD) film forming apparatus 50 shown in FIG. 4. The PCVD film forming apparatus 50 has a stainless steel vessel 40, a pedestal 41 provided inside the vessel 40, a gas inlet pipe 42 introduced from the exterior to the interior of the vessel 40, and a gas exhaust pipe 43 connecting the interior of the vessel 40 and the exterior. The gas inlet pipe 42 is connected to various gas cylinders (which are not shown in the figures) through a valve (which is not shown in the figures). The gas exhaust pipe 43 is connected to a rotary pump (which is not shown in the figures) and a diffusion pump (which is not shown in the figures) through a valve (which is not shown in the figures).

The base material 81 is placed on the pedestal 41. The vessel 40 is then sealed, and air inside the vessel 40 is evacuated with the rotary pump and the diffusion pump connected to the gas exhaust pipe 43. Hydrogen gas is introduced into the vessel 40 through the gas inlet pipe 42. Thereafter, a direct current voltage is applied between a stainless steel anode plate 44 and the pedestal 41 provided inside the vessel 40 to start electric discharge. The temperature of the base material 81 is increased by ion impact until the temperature of the base material 81 becomes constant.

Figure 3B:
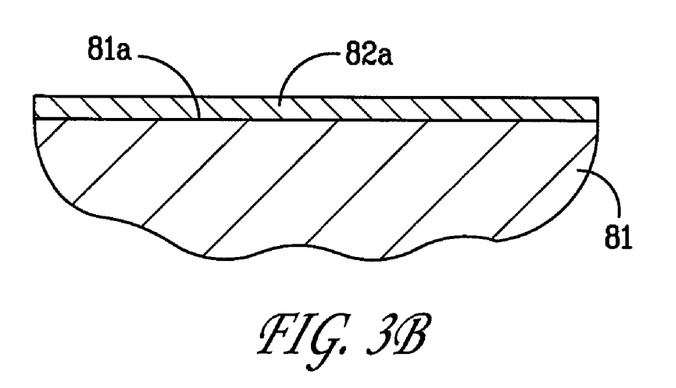
Figure 3C:
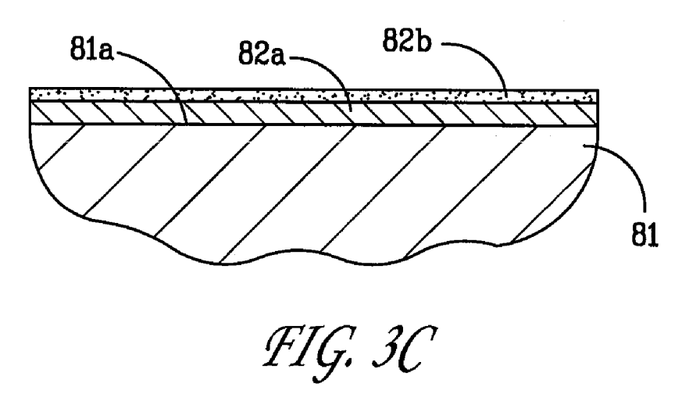

Subsequently, methane gas and TMS gas are introduced as a reaction gas through the gas inlet pipe 42, and hydrogen gas and argon gas are further introduced, whereby a first layer 82a formed of a DLC-Si film having a thickness of 2 μm and a surface roughness Rz of 3 μm or less is formed on the base material 81 as shown in FIG. 3B.

The second layer 82b is formed in the following manner. The following materials are prepared.

Solid lubricant: $MoS_2$

Binder resin: PAI resin varnish (PAI resin: 30% by mass, solvent (n-methyl-2-pyrrolidone: 56% by mass, xylene: 14% by mass): 70% by mass)

Epoxy Resin

The PAI resin has a number average molecular weight of 20,000 or more, contains a larger amount of imide groups than amide groups, and has a glass transition temperature of 307.1° C. and a tensile strength of 249 MPa (storage elastic modulus at 250° C. of $3.39 \times 10^9$ Pa).

The PAI resin varnish, $MoS_2$ and the epoxy resin are mixed. After well stirring, the mixture is subjected to a three-roll mill to prepare a coating composition. The coating composition is coated on the first layer 82a on the base material 81. Specifically, the coating composition is coated on the first layer 82a on the base material 81 for the swash plate 8 by a roll coating method, and the base material 81 is heated under conditions of a temperature of 200° C. for 60 minutes under atmospheric pressure to cure the uncured binder resin. The coating composition may also be coated by an air spraying method. According to the operation, the second layer 82b having a thickness of 10 μm is formed on the first layer 82a.

In the compressor having the aforementioned constitution, as shown in FIG. 1, the swash plate 8 is rotated by rotating the driving shaft 5 as being synchronized therewith, and the pistons 10 are reciprocated inside the cylinder bores 1b through the shoes 21. The capacity of the compression chambers formed on the head side of the pistons 10 are changed by the operation. Accordingly, refrigerant gas in the suction chamber 4a is introduced to and compressed in the compression chambers, and then discharged to the discharge chamber 4b. Thus, refrigeration operation is carried out with the refrigeration circuit constituted by the compressor, the condenser 13, the expansion valve 14 and the evaporator 15. During the refrigeration operation, the substantially flat surface of the shoes 21 slide on the sliding surface 8a of the swash plate 8, and the hemispherical surface thereof slides on the spherical surface bearings 10a of the piston 10.

Figure 5:
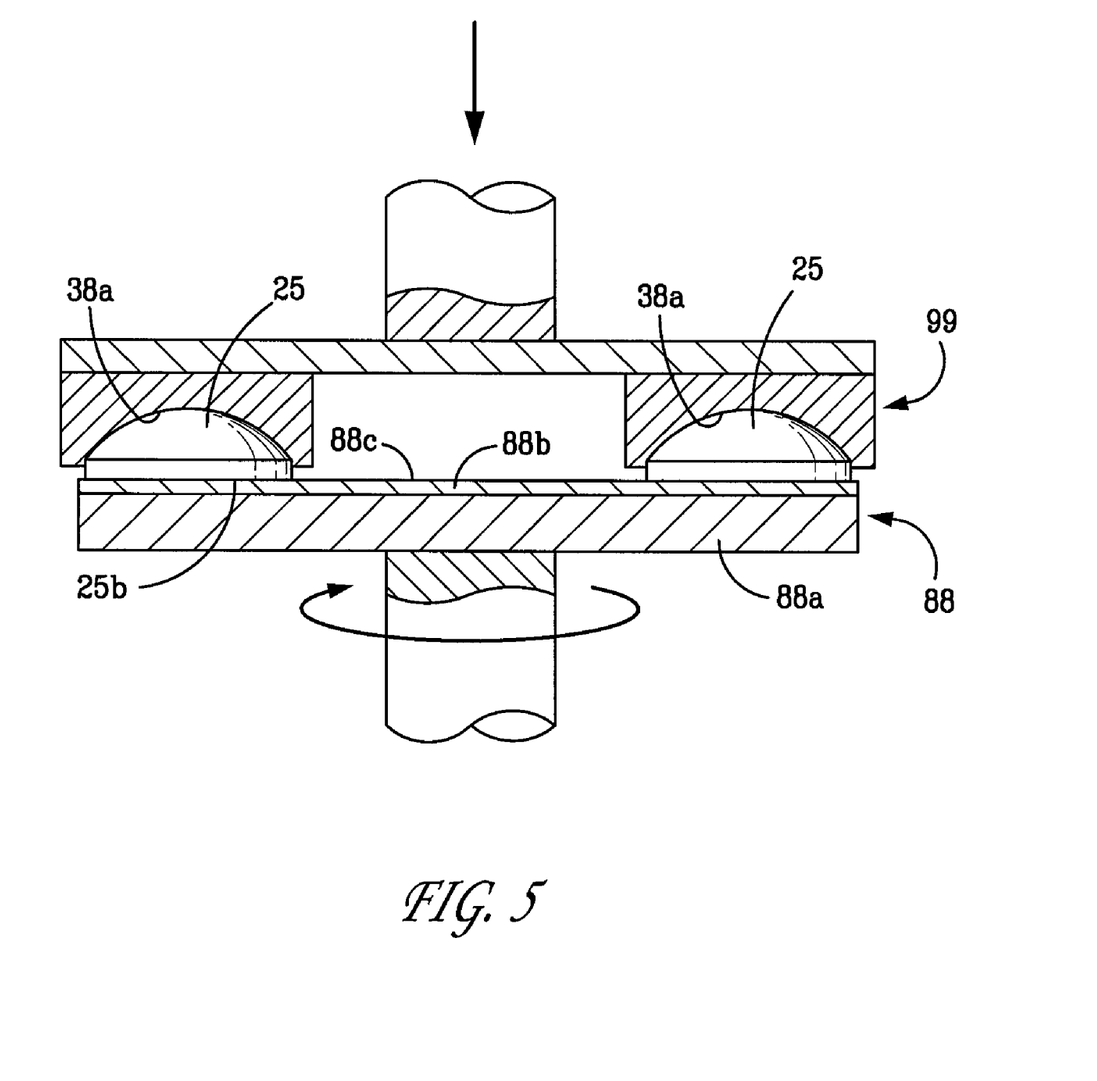
FIG. 5 is a schematic illustration showing a method for measuring a sticking load of a swash plate specimen and shoes.

The following test is carried out for evaluating the durability of the compressor of Embodiment 1. As shown in FIG. 5, a swash plate specimen 88 simulating the swash plate 8 and shoes 25 are prepared. The swash plate specimen 88 has a base material 88a that is the same kind as in the swash plate 8 having formed on the surface thereof various kinds of sliding layers 88b. The surface of the sliding layer 88b constitutes a flat sliding surface 88c, on which the shoes 25 slide. The shoes 25 are placed to make the substantially flat surface thereof in contact with the sliding layer 88b of the swash plate specimen 88. The shoes 25 are pressed on to the swash plate specimen 88 at a prescribed load with a pressing tool 99 having shoe bearings 38a corresponding to the hemispherical surface of the shoes 25 provided as being depressed in the pressing tool 99. The swash plate specimen 88 is rotated at a peripheral velocity of 7.8 m/sec and a load of 5,800 N with refrigerant oil fed at 75 mg/min in the state where the swash plate specimen 88 is in contact with the shoes 25, and the period of time until sticking of the shoes 25 to the swash plate specimen 88 occurs is measured.

The sliding layer 88b of the swash plate specimen 88 of Test Example 1 uses a DLC film having an Si content of 0% by mass as the first layer 82a as shown in Table 1. The sliding layers 88b of the swash plate specimens 88 of Test Examples 2 to 9 use a DLC-Si film having an Si content of 5 to 44% by mass as the first layer 82a. The sliding layers 88b of the swash plate specimens 88 of Test Examples 7 to 9 use the second layers 82b containing an epoxy resin. The results obtained are shown in Table 2.

TABLE 1

| Test Example | First layer Si content in amorphous hard carbon film (% by mass) | Second layer Solid lubricant (% by volume) | Second layer Epoxy resin (% by volume) | Second layer PAI resin varnish (% by volume) |
|---|---|---|---|---|
| 1 | 0 | 50 | 0 | 50 |
| 2 | 5 | 50 | 0 | 50 |
| 3 | 9 | 50 | 0 | 50 |
| 4 | 24 | 50 | 0 | 50 |
| 5 | 44 | 50 | 0 | 50 |
| 6 | 15 | 50 | 0 | 50 |
| 7 | 15 | 50 | 3 | 47 |
| 8 | 15 | 50 | 7.5 | 42.5 |
| 9 | 15 | 50 | 15 | 35 |

TABLE 2

| Test Example | Period of time until sticking (min) | |
| --- | --- | --- |
| | First test | Second test |
| 1 | 2 | 5 |
| 2 | 10 | — |
| 3 | 29 | — |
| 4 | 44 | — |
| 5 | 68 | 75 |
| 6 | 36 | 36 |
| 7 | 80 | — |
| 8 | 120 | 120 |
| 9 | 120 | — |

It is understood from Table 2 that the swash plate specimens 88 of Test Examples 2 to 9 attain prolongation of the period of time until sticking to the shoes 25 occurs as compared to the swash plate specimen 88 of Test Example 1. In the swash plate specimens 88 of Test Examples 2 to 9, it is considered that Si in the first layer 82a accelerates the anchor effect, whereby the second layer 82b is adhered favorably.

Accordingly, it is understood that the swash plate 8 of Embodiment 1 attains prolongation of the period of time until sticking to the shoes 21 occurs. Furthermore, it is also understood from Table 2 that the Si content of the first layer 82a is preferably from 5 to 44% by mass.

Therefore, the swash plate 8 of Embodiment 1 exhibits excellent durability and is free of lead to attain excellent protection of natural environments. Accordingly, a swash plate compressor using the swash plate 8 exhibits excellent environmental performance and realizes a prolonged service life.

The invention has been described with reference to Embodiment 1, but the invention is not limited to the embodiment 1, and can be practiced with various changes unless they deviate from the substance of the invention.

The base material may be an iron material, such as FCD or SUJ2. The surface of the base material is preferably roughened.

The sliding layer is formed on the surface of the base material to constitute a sliding surface, on which shoes slide. The sliding layer may constitute other surfaces than the sliding layer, i.e., other parts of the swash plate. According to the findings of the inventors, the thickness of the sliding layer is suitably from 3 to 50 μm, in which the thickness of the first layer is suitably from 0.5 to 5 μm, and the thickness of the second layer is suitably from 3 to 50 μm.

The DLC film as the first layer may be formed by a plasma CVD method, an ion plating method, a sputtering method or the like. In a PVD method, which is represented by a sputtering method, it is preferred to provide plural targets in the apparatus or to rotate the base material, on which the film is to be formed, since there is directivity in the film forming material. As a result, the apparatus therefor becomes complicated in structure, which brings about increase in cost. In a PVD method, there are some cases where it is difficult to form the film on the peripheral surface of the sliding member. In a plasma CVD method, on the other hand, the film can be easily formed on the base material of the sliding member since the film is formed with a reaction gas. The film forming apparatus for a plasma CVD method is simple in structure and is inexpensive. Examples of a plasma CVD method include a high frequency plasma CVD method using high frequency electric discharge, and a direct current plasma CVD method using direct current electric discharge, and a direct current plasma CVD method is preferred since the film forming apparatus can be easily constituted by a vacuum furnace and a direct current electric power source. The direct current plasma CVD method is preferred since the film can be formed simultaneously on the periphery of one surface of the base material of the sliding member and the periphery of the other surface thereof.

Upon forming a DLC film by a direct current plasma CVD method, a base material is placed in a vacuum vessel, to which a reaction gas and a carrier gas are introduced. Plasma is generated through electric discharge, and C, CH, Si and the like having been formed into plasma ions in the reaction gas are attached to the base material. Examples of the reaction gas include a hydrocarbon gas, such as methane ($CH_4$) and acetylene ($C_2H_2$), a silicon compound gas, such as Si$(CH_3)_4$ (TMS), $SiH_4$, $SiCl_4$ and $SiH_2F_2$, and hydrogen gas. Examples of the carrier gas include argon gas.

The surface roughness Rz of the first layer is preferably 3 μm or less. The surface roughness of the DLC film is considerably small, and thus the frictional force of the limiting membrane between the shoes and the film when the second layer is peeled off is decreased, whereby the frictional coefficient is decreased. In the case where the surface roughness Rz of the first layer exceeds 3 μm, large protrusions are formed on the DLC film, and when the second layer is peeled off in long-term use, the protrusions attack the shoes to impair the sliding property of the shoes with respect to the swash plate, whereby there are problems including sticking of the shoes to the piston, which brings about possibility of deterioration in durability of the swash plate compressor. The surface roughness is calculated according to the method defined in JIS B0601 (1994).

It has been known that the Si content of the DLC film is preferably 1 to 20% by mass from the standpoint of the frictional coefficient of the DLC film (as described in JP-A-2006-22666). In the sliding member of the invention, according to the tests made by the inventors, the Si content of the first layer is preferably from 5 to 44% by mass. In the case where the Si content is less than 5% by mass, the adhesion property of the second layer is not significantly improved to fail to provide a practical period of time until sticking. In the case where the Si content exceeds 44% by mass, the DLC film suffers a too large wear amount.

The second layer contains a polymer containing an amide group and/or an imide group, such as PAI, containing a solid lubricant. The second layer can be formed by coating on the first layer on the base material a coating composition obtained by kneading an uncured PAI resin and a solid lubricant, followed by heating. The second layer thus formed contains the solid lubricant in a binder resin formed of cured PAI. In the second layer, the solid lubricant is bound inside the binder resin as similar to the conventional product to improve the sticking resistance and the wear resistance. According to the tests made by the inventors, the second layer that is formed of a PAI resin having a high glass transition temperature, a PAI resin having a large tensile strength or a PAI resin having a larger amount of imide groups than amide groups exhibits further improved sliding property under severer conditions. In particular, according to the tests made by the inventors, a PAI resin having a glass transition temperature of 270° C. or more is preferably used, and a PAI resin having a glass transition temperature of 290° C. or more is particularly preferably used. A PAI resin having a tensile strength at ordinary temperature of 200 MPa or more is also preferably used. According to the inventors, the PAI resin is preferably a PAI resin having a larger amount of imide groups than amide groups. The PAI resin preferably has a number average molecular weight of 20,000 or more. The inventors have confirmed advantages of these PAI resins.

Examples of the solid lubricant include $MoS_2$, polytetrafluoroethylene (PTFE), ethylenetetrafluoroethylene (ETFE), a tetrafluoroethylene-hexafluoropropylene copolymer (FEP) or graphite.

According to the tests made by the inventors, the second layer is preferably formed of a polymer containing an epoxy resin. In the case where the second layer contains an epoxy resin, the adhesion property of the second layer is further improved to attain a further prolonged period of time until sticking.

The shoes as the counterparts of the swash plate may be those formed of an iron material, such as SUJ2, or an aluminum material. According to the tests made by the inventors, the swash plate of the invention provides a larger effect with shoes formed of iron material, such as SUJ2. Each shoe formed of aluminum material may have a plated layer formed of Ni on the surface thereof.

The swash plate compressor may use ordinary refrigerant, such as R134a, and also may use $CO_2$ refrigerant. In the case where $CO_2$ is used as the refrigerant, particularly, the advantage of the invention can be significantly obtained. This is because the compressing pressure becomes very high as about 5 MPa with $CO_2$ as the refrigerant, and thus the compression reactive force acting on the swash plate from the piston through the shoes also becomes very high. This is also because $CO_2$ as the refrigerant is considerably poor in lubricating property as compared to the ordinary refrigerant even though a lubricating component is added thereto.

The sliding member of the invention may be used in various kinds of swash plate compressors using a swash plate. For example, it can be used in an ordinary swash plate compressor using a single swash plate, and in such a swash plate compressor that uses a first swash plate that is rotatable along with the driving shaft, and a second swash plate that is supported relatively rotatably by the first swash plate. In the case of a swash plate compressor using a single swash plate, the swash plate of the invention may be used as a swash plate that is changed in inclination angle thereof with respect to the driving shaft and may be used as a swash plate that is not changed in inclination angle thereof with respect to the driving shaft. In the case of a swash plate compressor using swash plates including the first swash plate and the second swash plate, the swash plate of the invention may be used as the second swash plate.

The invention may be applied to a swash plate compressor.

The invention claimed is:

1. A sliding member comprising a base material having on the surface thereof a sliding layer constituting at least a sliding surface, the sliding layer comprising:
    a first layer formed on the base material, the first layer containing an amorphous hard carbon film containing Si, and
    a second layer formed on the first layer, the second layer containing a polymer containing an amide group and/or an imide group and containing a solid lubricant.

2. The sliding member as claimed in claim 1, wherein the sliding member is a swash plate used in a compressor, and the sliding layer constitutes at least a sliding surface, on which shoes slide.

3. The sliding member as claimed in claim 1, wherein the first layer has a surface roughness Rz of 3 μm or less.

4. The sliding member as claimed in claim 1, wherein the first layer has an Si content of from 5 to 44% by mass.

5. The sliding member as claimed in claim 1, wherein the second layer comprises a polymer containing an epoxy resin.

* * * * *